United States Patent
Han et al.

(10) Patent No.: US 9,931,615 B2
(45) Date of Patent: Apr. 3, 2018

(54) EXHAUST GAS OXIDATION CATALYST FOR COMPRESSED NATURAL GAS COMBUSTION SYSTEM

(71) Applicant: HEESUNG CATALYSTS CORPORATION, Gyeonggi-do (KR)

(72) Inventors: Hyun-sik Han, Seoul (KR); Seung Chul Na, Gyeonggi-do (KR); Eun-seok Kim, Gyeonggi-do (KR); Joon-Woo Kim, Gyeonggi-do (KR)

(73) Assignee: HEESUNG CATALYSTS CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/107,299

(22) PCT Filed: Dec. 16, 2014

(86) PCT No.: PCT/KR2014/012382
§ 371 (c)(1),
(2) Date: Jun. 22, 2016

(87) PCT Pub. No.: WO2015/099348
PCT Pub. Date: Jul. 2, 2015

(65) Prior Publication Data
US 2017/0007987 A1   Jan. 12, 2017

(30) Foreign Application Priority Data
Dec. 24, 2013 (KR) .................. 10-2013-0161979

(51) Int. Cl.
*B01J 23/63* (2006.01)
*B01J 23/42* (2006.01)
(Continued)

(52) U.S. Cl.
CPC ............... *B01J 23/63* (2013.01); *B01J 23/42* (2013.01); *B01J 23/44* (2013.01); *B01J 23/58* (2013.01);
(Continued)

(58) Field of Classification Search
CPC ... B01J 23/63; B01J 23/42; B01J 23/44; B01J 23/894; B01J 35/04; B01J 37/04; F01N 3/20; F01N 3/2825; F01N 3/10
(Continued)

(56) References Cited

U.S. PATENT DOCUMENTS

| 7,329,629 B2 * | 2/2008 | Gandhi | ............... B01D 53/945 502/304 |
| 7,576,031 B2 * | 8/2009 | Beutel | ...................... B01J 23/44 502/326 |

(Continued)

FOREIGN PATENT DOCUMENTS

| KR | 10-0230874 | 11/1999 |
| KR | 10-2003-0024085 | 3/2003 |

(Continued)

OTHER PUBLICATIONS

International Search Report dated Feb. 12, 2015 for application PCT/KR2014/012382, filed on Dec. 16, 2014 and published as WO/2015/099348 on Jul. 2, 2015 (Applicant—Heesung Catalysts Corp. // Inventor—Han, et al.) (2 pages).

*Primary Examiner* — Patricia L. Hailey
(74) *Attorney, Agent, or Firm* — Ballard Spahr LLP

(57) ABSTRACT

Disclosed is a catalyst composition for inhibiting the deactivation of a catalyst for purifying exhaust gas from a compressed natural gas combustion system, which contains platinum and palladium as precious metal components. Specifically, a catalyst for purifying exhaust gas from a compressed natural gas vehicle or a static combustion sys-
(Continued)

tem is configured such that a ceramic substrate is impregnated with palladium-impregnated first alumina, platinum-impregnated second alumina, and a ceria component, wherein the first alumina is further impregnated with a cocatalyst selected from the group consisting of barium, nickel, lanthanum, samarium, and yttrium, thus significantly inhibiting the deactivation of the CNG lean burn engine catalyst.

10 Claims, 3 Drawing Sheets

(51) Int. Cl.
*B01J 37/04* (2006.01)
*B01J 23/44* (2006.01)
*B01J 23/89* (2006.01)
*B01J 35/04* (2006.01)
*F01N 3/20* (2006.01)
*F01N 3/28* (2006.01)
*B01J 35/00* (2006.01)
*B01J 23/58* (2006.01)
*F01N 3/10* (2006.01)

(52) U.S. Cl.
CPC .......... *B01J 23/892* (2013.01); *B01J 23/894* (2013.01); *B01J 35/0006* (2013.01); *B01J 35/04* (2013.01); *B01J 37/04* (2013.01); *F01N 3/20* (2013.01); *F01N 3/2825* (2013.01); *B01D 2255/1021* (2013.01); *B01D 2255/1023* (2013.01); *B01D 2255/2042* (2013.01); *B01D 2255/2061* (2013.01); *B01D 2255/2063* (2013.01); *B01D 2255/20753* (2013.01); *B01D 2257/7025* (2013.01); *B01D 2258/018* (2013.01); *F01N 3/10* (2013.01)

(58) Field of Classification Search
USPC ....... 502/302, 330, 333–335, 339; 423/213.5
See application file for complete search history.

(56) References Cited

U.S. PATENT DOCUMENTS

| | | | |
|---|---|---|---|
| 7,923,407 | B2 | 4/2011 | Goto |
| 8,877,675 | B2 | 4/2014 | Nakamura |
| 8,808,653 | B2 | 8/2014 | Goto |
| 2002/0081255 | A1* | 6/2002 | Cutler .................. B01D 53/865 423/213.5 |
| 2007/0093383 | A1 | 4/2007 | Han |
| 2007/0219089 | A1 | 9/2007 | Goto |
| 2008/0167181 | A1 | 7/2008 | Nakamura |
| 2010/0183490 | A1* | 7/2010 | Hoke .................. B01D 53/945 423/213.5 |
| 2012/0027654 | A1 | 2/2012 | Mikita |

FOREIGN PATENT DOCUMENTS

| | | |
|---|---|---|
| KR | 10-0461125 | 11/2003 |
| KR | 10-0670221 | 1/2007 |
| KR | 10-2007-0094493 | 9/2007 |
| KR | 10-2008-0065921 | 7/2008 |
| KR | 10-2011-0129381 | 12/2011 |

* cited by examiner

[FIG. 1]
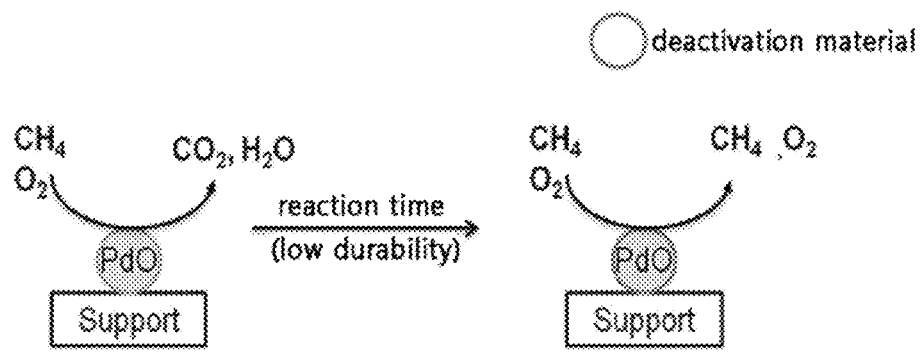
[FIG. 2]
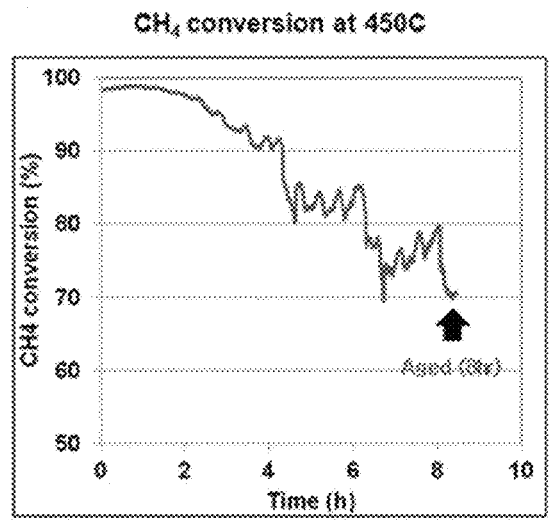

[FIG. 3]
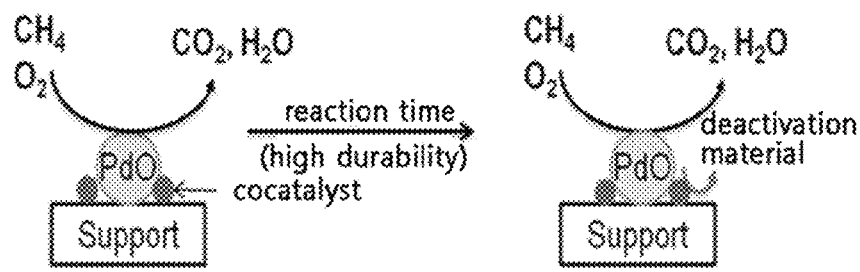
[FIG. 4]
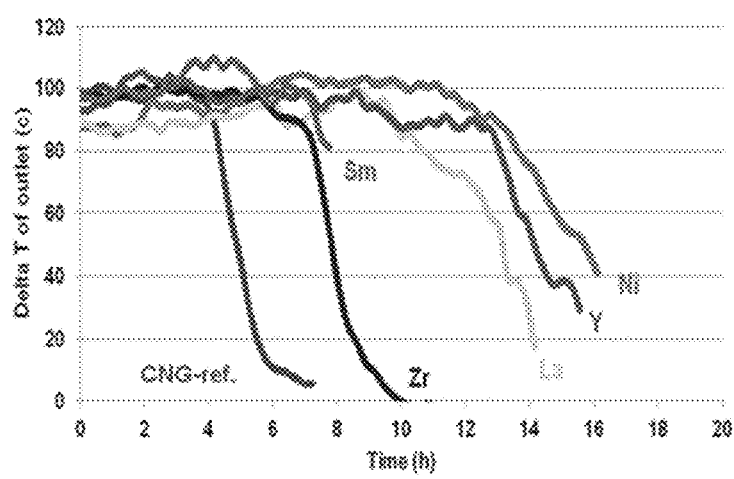
[FIG. 5]
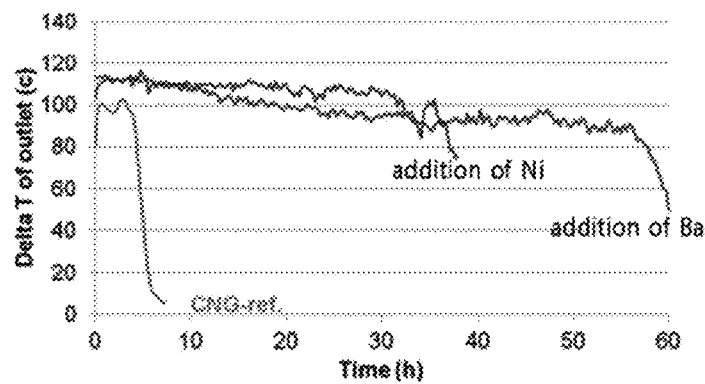

[FIG. 6]
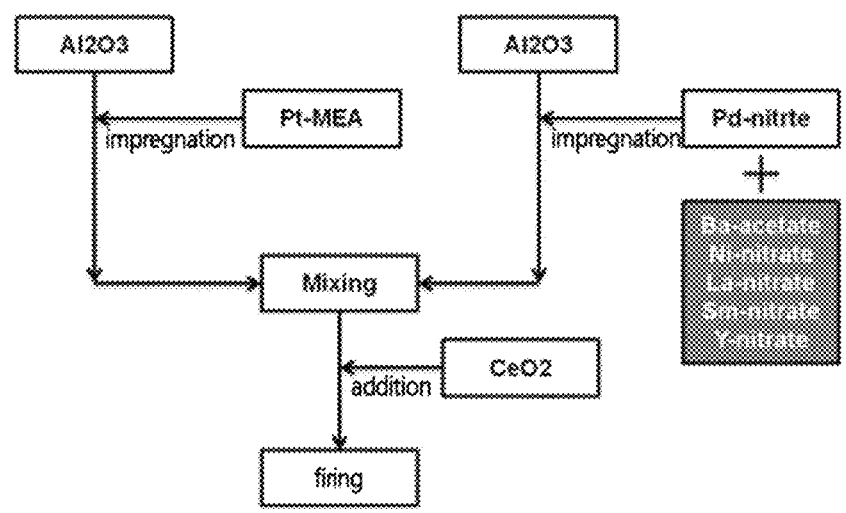

EXHAUST GAS OXIDATION CATALYST FOR COMPRESSED NATURAL GAS COMBUSTION SYSTEM

CROSS-REFERENCE TO RELATED APPLICATIONS

This application is a U.S. National Phase Application of International Application No. PCT/KR2014/012382, filed Dec. 16, 2014, which claims priority to Korean Patent Application No. 10-2013-0161979, filed Dec. 24, 2013, each of which are hereby incorporated by reference in their entirety.

TECHNICAL FIELD

The present invention relates to an exhaust gas oxidation catalyst for a compressed natural gas combustion system and, more particularly, to a catalyst for purifying exhaust gas from a compressed natural gas lean burn engine, which is configured such that a conventional catalyst for purifying exhaust gas from a compressed natural gas lean burn engine, containing platinum and palladium as precious metal components, is further impregnated with a specific cocatalyst, thus inhibiting the deactivation of the catalyst.

BACKGROUND ART

When a combustion system including a vehicle engine uses CNG (Compressed Natural Gas) as fuel, environmentally friendly properties may be exhibited, economic benefits may result, and toxic materials such as HC, CO, PM (Particulate Matter) are discharged in smaller amounts, whereby there are almost none of the odors and fumes of exhaust gas. In the present invention, the combustion system comprehensively includes a vehicle engine, and in some cases, a combustion system other than a vehicle is referred to as a static combustion system, which is distinguished from a vehicle, that is, a dynamic combustion system.

A catalyst for purifying exhaust gas from a compressed natural gas vehicle and a method of refining the same are disclosed in Korean Patent Nos. 230874 and 461125. In Korean Patent No. 230874 ("Catalyst for purifying compressed natural gas vehicle exhaust gas and a method of refining the same"), the catalyst is configured such that a ceramic substrate is impregnated with a supporting material, such as alumina, ceria or zirconia, and a precious metal, serving as a catalytically active material, in order to efficiently purify methane, which constitutes most CNG vehicle exhaust gas. In Korean Patent No. 461125 ("Catalyst for purifying compressed natural gas vehicle exhaust gas"), in order to purify methane, which is difficult to purify, the catalyst is configured such that a ceramic substrate is impregnated with, based on 1 L of the substrate, a predetermined amount of gamma alumina, $La_2O_3$, 1 to 50 g of $CeO_2$, 1 to 20 g of BaO, and 0.1 to 10 g of a catalytically active material comprising palladium (Pd) and platinum (Pt) at a weight ratio of 5 to 15:1. Moreover, in the exhaust gas oxidation catalyst for a compressed natural gas vehicle, containing Pd and Pt as precious metal components, as disclosed in Korean Patent No. 670221 by the present applicant, the ceramic substrate is impregnated with Pd-impregnated first alumina, Pt-impregnated second alumina, composite ceria, such as $CeO_2$—$ZrO_2$, and nickel oxide.

DISCLOSURE

Technical Problem

Currently useful as the CNG exhaust gas purification catalyst for CNG engines that operate in a lean burn atmosphere, a catalyst for purifying exhaust gas from a compressed natural gas vehicle, containing Pt and Pd as precious metal components, has satisfactory purification efficiency of methane, which is the main component of natural gas, but the durability of the catalyst may decrease, that is, the deactivation thereof may become problematic. The causes of the deactivation of the Pt/Pd-based exhaust gas purification catalyst for CNG lean burn engines have not been accurately identified.

Technical Solution

An object of the present invention is to provide a catalyst composition for inhibiting the deactivation of a catalyst for purifying exhaust gas from a compressed natural gas combustion system, containing Pt and Pd as precious metal components. More specifically, an object of the present invention is to provide a catalyst composition, wherein a cocatalyst is added to thus change the electron state of Pd, serving as the precious metal, thereby inhibiting the deactivation of the catalyst. The present inventors have ascertained that when cocatalyst components, which are regarded as affecting the electron state of Pd, are added to a Pd-impregnated support, the deactivation material may be easily discharged. Particularly, a catalyst for purifying exhaust gas from a compressed natural gas combustion system is configured such that a ceramic substrate is impregnated with Pd-impregnated first alumina, Pt-impregnated second alumina, and a ceria component, wherein the Pd-impregnated first alumina is further impregnated with a cocatalyst selected from the group consisting of barium, nickel, lanthanum, samarium, and yttrium, remarkably inhibiting the deactivation of the CNG lean burn engine catalyst. Without limitation thereto, Pd and Pt, which are respectively added to the first alumina and the second alumina, have a weight ratio ranging from 10:1 to 1:1. In the present invention, the cocatalyst is further added in an amount of 1 to 100 wt % based on the amount of Pd, and the Pd-impregnated alumina and the Pt-impregnated alumina have a weight ratio ranging from 35:32 to 80:32.

Advantageous Effects

According to the present invention, the deactivation of a CNG lean burn engine catalyst is inhibited with the addition of palladium and a cocatalyst selected from the group consisting of barium, nickel, lanthanum, samarium, and yttrium.

DESCRIPTION OF DRAWINGS

FIG. 1 schematically illustrates the deactivation of a conventional CNG lean burn engine exhaust gas catalyst;

FIG. 2 illustrates the conversion of methane over time by the conventional CNG catalyst;

FIG. 3 schematically illustrates the configuration of a catalyst according to the present invention;

FIG. 4 illustrates the catalytic activity over time of the CNG lean burn engine exhaust gas catalyst containing a variety of cocatalysts according to the present invention, delta T showing the difference in temperature between the catalyst outlet and the catalyst inlet;

FIG. 5 illustrates the catalytic activity over time of the CNG lean burn engine exhaust gas catalyst containing Ba or Ni, which is regarded as the effective cocatalyst according to the present invention; and FIG. 6 illustrates the process of preparing the CNG lean burn engine exhaust gas catalyst according to the present invention.

BEST MODE

Hereinafter, a detailed description will be given of embodiments of the present invention, but the present invention is not limited to these embodiments.

As mentioned above, the catalyst for purifying exhaust gas from a CNG lean burn engine is composed mainly of Pt and Pd. However, the catalyst is currently problematic because it is drastically deactivated over time for various reasons. FIG. 1 schematically illustrates the deactivation of a conventional CNG lean burn engine exhaust gas catalyst. As disclosed in Korean Patent No. 670221, which is hereby incorporated by reference in its entirety into this application, the CNG lean burn engine exhaust gas catalyst is configured such that a metal or ceramic substrate is impregnated with Pd-impregnated first alumina, Pt-impregnated second alumina, $CeO_2$-$ZrO_2$, as composite ceria, and nickel oxide. Only the structure of the Pd-impregnated first alumina is briefly illustrated in FIG. 1. As the reaction time passes, the Pd catalyst is not activated anymore. This is attributable to various causes, but is deemed to be due to the production of deactivation material. FIG. 2 illustrates the extent of deactivation, which drastically lowers the methane conversion with the lapse of reaction time. As shown in the test results of FIG. 2, the conventional catalyst for purifying exhaust gas from a CNG lean burn engine including PGM (precious metal) of 300 g/ft³ and 1 Pt/5 Pd undergoes hydrothermal aging under conditions of 750° C./10 hr, and 10% water, using a gas feed comprising 7000 ppm of $CH_4$, 5% of $O_2$, 5% of $H_2O$, and the balance of $N_2$ at a space velocity (SV) of 50,000 hr$^{-1}$. Under these conditions, the conventional catalyst was deactivated after 8 hr, as shown in FIG. 2.

The present inventors have paid attention to the fact that Pd is more effective than Pt at converting methane, and thus have introduced the cocatalyst, which is adjacent to Pd. Specifically, a Pd-impregnated support is added with a cocatalyst selected from the group consisting of barium, nickel, lanthanum, samarium, and yttrium. Although the present invention is not limited to any particular theory, the cocatalyst components are likely to change the electron state of Pd through complexation. Changes in the electron state of Pd are considered to aid in the discharge of deactivation material. FIG. 6 summarizes the process of preparing the catalyst according to the present invention. The first alumina is impregnated with Pd and a cocatalyst precursor, and simultaneously, the second alumina is impregnated with Pt, after which they are mixed, added with ceria, uniformly milled, and fired, thus yielding a catalyst. Preferably, the weight ratio of Pd and Pt, which are respectively added to the first alumina and the second alumina, ranges from 10:1 to 1:1, the cocatalyst is further added in an amount of 1 to 100 wt % based on the amount of Pd, and the Pd-cocatalyst-impregnated alumina and the Pt-impregnated alumina preferably have a weight ratio of 35:32 to 80:32. This ratio is specifically described in Korean Patent No. 670221, which is hereby incorporated in its entirety by reference into the present invention. If the amount of the cocatalyst according to the present invention is less than 1 wt % relative to Pd, the function of the cocatalyst cannot be exhibited. On the other hand, if the amount thereof exceeds 100 wt % relative to Pd, the function of Pd may deteriorate, making it impossible to obtain optimal catalytic performance. FIG. 3 schematically illustrates the configuration of the catalyst according to the present invention. The cocatalyst component is added only to the Pd-impregnated support, and is not added to the support impregnated with the other precious metal, that is, Pt. The cocatalyst component undergoes electronic interaction with the Pd component, thus forming a complex, thereby changing the activity of Pd. Even with the lapse of the reaction time, the catalyst of the invention is not deactivated, but its activity is maintained, unlike the conventional CNG lean burn engine exhaust gas catalyst. FIG. 4 illustrates the catalytic activity over time of the CNG lean burn engine exhaust gas catalyst containing a variety of cocatalysts according to the present invention. Based on the test results shown in FIG. 4, the conventional catalyst including PGM (precious metal) of 320 g/ft³ and 1 Pt/5 Pd and the catalyst of the invention undergo hydrothermal aging under conditions of 750° C./10 hr, and 10% water, using a gas feed comprising 5000 ppm of $CH_4$, 15% of $O_2$, 10% of $H_2O$, and the balance of $N_2$ at a space velocity (SV) of 60,000 hr$^{-1}$, delta T indicating the temperature difference between the catalyst outlet and the catalyst inlet. In FIG. 4, CNG-ref. designates the comparative catalyst, and the Pd-impregnated support is additionally impregnated with the cocatalyst according to the present invention, that is, Sm, La, Y or Ni. Compared to the delta T of the conventional catalyst, as shown in FIG. 4 under these conditions, the catalyst of the invention may retain its catalytic activity for a long period of time. FIG. 5 illustrates the catalytic activity over time of the CNG lean burn engine exhaust gas catalyst containing Ba or Ni, which is regarded as the effective cocatalyst according to the present invention, under the same conditions as in FIG. 4. Remarkably, the effect of the cocatalyst Ba on inhibiting the deactivation of the catalyst is the greatest among the cocatalyst candidates.

MODE FOR INVENTION

A better understanding of the present invention may be obtained through the following examples, which are set forth to illustrate, but are not to be construed to limit the present invention. In particular, the metal precursors used as the precious metal and the cocatalyst are not limited to these examples, and nitrate, acetate, chloride, sulfate, etc. may alternatively be used. For the sake of brevity of description, a lean burn engine vehicle is exemplified, but the present invention may be applied to all combustion systems using compressed natural gas as fuel.

EXAMPLE 1 a. 32.0 g/l of a first alumina powder was impregnated with chloroplatinic acid, and 80.0 g/l of a second alumina powder was impregnated with palladium nitrate and barium acetate, thus preparing a Pt-impregnated active alumina and a Pd—Ba-impregnated active alumina, having a total precious metal content of 320 g/ft³ and Pd and Pd at a weight ratio of 1:10 to 1:1, after which 11 g/l of a ceria powder was dispersed in water, thus preparing a slurry.

b. The slurry was subjected to ball milling so that the particle size of about 90% thereof was 8 to 10 µm, after which the treated slurry was applied on a cordierite honeycomb, dried at 150 to 160° C. for about 10 min, and fired at 530 to 550° C. for about 40 to 60 min, thereby completing a catalyst.

EXAMPLES 2 to 5

Respective catalysts were prepared in the same manner as in Example 1, with the exception that nickel nitrate, lanthanum nitrate, samarium nitrate, and yttrium nitrate, rather than barium acetate, were used in step a.

COMPARATIVE EXAMPLE

A comparative catalyst was prepared in the same manner as in Example 1, with the exception that barium acetate was not used in step a.

Based on the activity test results for the prepared catalysts, the cocatalyst components are regarded as solving the deactivation problem of the existing CNG lean burn engine exhaust gas catalyst.

The invention claimed is:

1. A catalyst for purifying exhaust gas from a compressed natural gas lean burn engine vehicle or a static combustion system comprising a ceramic substrate impregnated with a palladium-impregnated first alumina, a platinum-impregnated second alumina, and a ceria component, wherein the first alumina is further impregnated with a cocatalyst selected from the group consisting of nickel, lanthanum, samarium, and yttrium, wherein the palladium-impregnated first alumina does not comprise barium.

2. The catalyst of claim 1, wherein the cocatalyst is added in an amount of 1 to 100 wt % based on the amount of palladium in the catalyst.

3. The catalyst of claim 1, wherein a weight ratio of palladium and platinum, which are respectively added to the first alumina and the second alumina, ranges from 10:1 to 1:1.

4. The catalyst of claim 1, wherein the cocatalyst is nickel.

5. The catalyst of claim 1, wherein the cocatalyst is lanthanum.

6. The catalyst of claim 1, wherein the cocatalyst is samarium.

7. The catalyst of claim 1, wherein the cocatalyst is yttrium.

8. A method for purifying exhaust gas from a compressed natural gas lean burn engine vehicle or a static combustion system comprising the step of contacting the exhaust gas from a compressed natural gas lean burn engine vehicle or a static combustion system with the catalyst of claim 1, thereby purifying exhaust gas from a compressed natural gas lean burn engine vehicle or a static combustion system.

9. The method of claim 8, wherein the method is performed for a period of time of least 6 hours, and wherein the activity of the catalyst remains essentially constant over the period of time.

10. A method for making the catalyst of claim 1 for inhibiting deactivation of the catalyst for purifying exhaust gas from a compressed natural gas lean burn engine vehicle or a static combustion system, the method comprising having a ceramic substrate impregnated with a palladium-impregnated first alumina, a platinum-impregnated second alumina, and a ceria component, and impregnating the palladium-impregnated first alumina with a cocatalyst selected from the group consisting of nickel, lanthanum, samarium, and yttrium.

* * * * *